(12) United States Patent
Moniz et al.

(10) Patent No.: US 10,823,064 B2
(45) Date of Patent: Nov. 3, 2020

(54) GAS TURBINE ENGINE

(71) Applicant: General Electric Company, Schenectady, NY (US)

(72) Inventors: Thomas Ory Moniz, Loveland, OH (US); Joseph George Rose, Mason, OH (US); Jeffrey Donald Clements, Mason, OH (US)

(73) Assignee: General Electric Company, Schenectady, NY (US)

( * ) Notice: Subject to any disclaimer, the term of this patent is extended or adjusted under 35 U.S.C. 154(b) by 455 days.

(21) Appl. No.: 15/286,621

(22) Filed: Oct. 6, 2016

(65) Prior Publication Data

US 2018/0100435 A1 Apr. 12, 2018

(51) Int. Cl.
*F02C 7/06* (2006.01)
*F02C 3/06* (2006.01)
*F02C 3/04* (2006.01)
*F01D 25/16* (2006.01)

(52) U.S. Cl.
CPC ............. *F02C 7/06* (2013.01); *F01D 25/16* (2013.01); *F02C 3/04* (2013.01); *F02C 3/06* (2013.01)

(58) Field of Classification Search
CPC ............. F02C 7/06; F02C 3/04; F01D 25/16
See application file for complete search history.

(56) References Cited

U.S. PATENT DOCUMENTS

| | | | |
|---|---|---|---|
| 4,456,425 A | 6/1984 | McCarty et al. | |
| 4,900,221 A * | 2/1990 | Ciokajlo | F01D 25/162 415/142 |
| 6,331,078 B1 * | 12/2001 | Van Duyn | F01D 21/04 384/498 |
| 7,055,330 B2 | 6/2006 | Miller | |
| 7,065,954 B2 * | 6/2006 | Labala | F01D 25/18 184/11.2 |
| 7,144,349 B2 | 12/2006 | Mitrovic | |
| 7,377,098 B2 | 5/2008 | Walker et al. | |
| 7,470,110 B2 * | 12/2008 | Jonsson | F01D 5/027 415/216.1 |
| 7,752,836 B2 * | 7/2010 | Orlando | F02C 3/067 60/268 |
| 7,921,634 B2 * | 4/2011 | Orlando | F01D 1/24 60/204 |
| 8,100,646 B2 * | 1/2012 | Venter | F01D 25/168 384/461 |
| 8,402,741 B1 * | 3/2013 | Merry | F01D 25/16 60/226.1 |

(Continued)

OTHER PUBLICATIONS

Turbofan—Wikipedia, the free encyclopedia (Year: 2014).*

*Primary Examiner* — Richard A Edgar
*Assistant Examiner* — Maranatha Boardman
(74) *Attorney, Agent, or Firm* — Dority & Manning, P.A.

(57) ABSTRACT

A gas turbine engine includes a low pressure compressor and a low pressure turbine, with a low pressure shaft coupled to the low pressure turbine through a turbine extension and coupled to the low pressure compressor through a compressor extension. A forward bearing assembly supports the low pressure shaft within a compressor section and at a location aft of the compressor extension and an aft LP bearing assembly supports the low pressure shaft within a turbine section at a location aft of the turbine extension.

20 Claims, 5 Drawing Sheets

(56) References Cited

U.S. PATENT DOCUMENTS

| | | | | |
|---|---|---|---|---|
| 8,511,987 | B2* | 8/2013 | Reinhardt | F01D 25/162 |
| | | | | 415/229 |
| 9,376,202 | B2* | 6/2016 | Szymandera | B64C 11/308 |
| 2013/0195647 | A1* | 8/2013 | Muldoon | F01D 25/162 |
| | | | | 415/229 |
| 2013/0340435 | A1* | 12/2013 | Savela | F02C 3/00 |
| | | | | 60/722 |
| 2014/0301829 | A1* | 10/2014 | Reinhardt | F01D 25/162 |
| | | | | 415/111 |
| 2016/0053634 | A1 | 2/2016 | Schwarz et al. | |
| 2016/0108808 | A1 | 4/2016 | Sheridan et al. | |
| 2016/0115865 | A1 | 4/2016 | Schwarz et al. | |
| 2018/0100435 | A1* | 4/2018 | Moniz | F02C 3/04 |
| 2018/0106274 | A1* | 4/2018 | Moniz | F04D 29/324 |

\* cited by examiner

US 10,823,064 B2

GAS TURBINE ENGINE

FIELD OF THE INVENTION

The present subject matter relates generally to a gas turbine engine, or more particularly to a gas turbine engine bearing assembly configuration.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. With multi-shaft gas turbine engines, the compressor section can include a high pressure compressor (HP compressor) and a low pressure compressor (LP compressor), and the turbine section can similarly include a high pressure turbine (HP turbine) and a low pressure turbine (LP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and HP compressor until it reaches the combustion section. Fuel is mixed with the compressed air and burned within the combustion section to provide combustion gases. The combustion gases are routed from the combustion section through the HP turbine and LP turbine. The flow of combustion gasses through the turbine section drives the HP turbine and the LP turbine, each of which in turn drive a respective one of the HP compressor and the LP compressor via the HP shaft and LP shaft. The combustion gases are then routed through the exhaust section, e.g., to atmosphere.

In addition to driving the LP compressor, the LP shaft can additionally drive the fan through a fan gearbox. The gearbox allows the LP shaft to be rotated at a higher speed relative to the fan for greater efficiency. However, rotation of the LP shaft at the relatively high speeds for achieving the desired rotational speed of the fan may result in an instability of the LP shaft. An option for improving the stability of the LP shaft is to make the LP shaft larger in diameter. However, the LP shaft can be restricted by radial space limitations, due to the HP core components.

Accordingly, a gas turbine engine able to increase the stability of the LP shaft while rotating the LP shaft at relatively high speeds would be useful. Specifically, a gas turbine engine able to increase the stability of the LP shaft without requiring a diameter of the LP shaft to be substantially increased would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine defining an axial direction is provided. The gas turbine engine includes a compressor section including a low pressure compressor, and a turbine section located downstream of the compressor section and including a low pressure turbine. The gas turbine engine also includes a low pressure shaft including a turbine extension and a compressor extension. The low pressure shaft is coupled to the low pressure turbine through the turbine extension and is coupled to the low pressure compressor through the compressor extension. The gas turbine engine also includes a forward LP bearing assembly supporting the low pressure shaft within the compressor section at a location aft of the compressor extension, the forward LP bearing assembly including a first bearing and a second bearing spaced generally along the axial direction. The gas turbine engine also includes an aft LP bearing assembly supporting the low pressure shaft within the turbine section at a location aft of the turbine extension.

In one exemplary embodiment of the present disclosure, a gas turbine engine defining an axial direction is provided. The gas turbine engine includes a compressor section including a low pressure compressor, and a turbine section located downstream of the compressor section and including a low pressure turbine. The gas turbine engine also includes a low pressure shaft including a turbine extension and a compressor extension. The low pressure shaft is coupled to the low pressure turbine through the turbine extension and is coupled to the low pressure compressor through the compressor extension. The gas turbine engine also includes a forward LP bearing assembly supporting the low pressure shaft within the compressor section at a location aft of the compressor extension. The gas turbine engine also includes an aft LP bearing assembly supporting the low pressure shaft within the turbine section at a location aft of the turbine extension, the aft LP bearing assembly including a forward bearing and an aft bearing spaced generally along the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
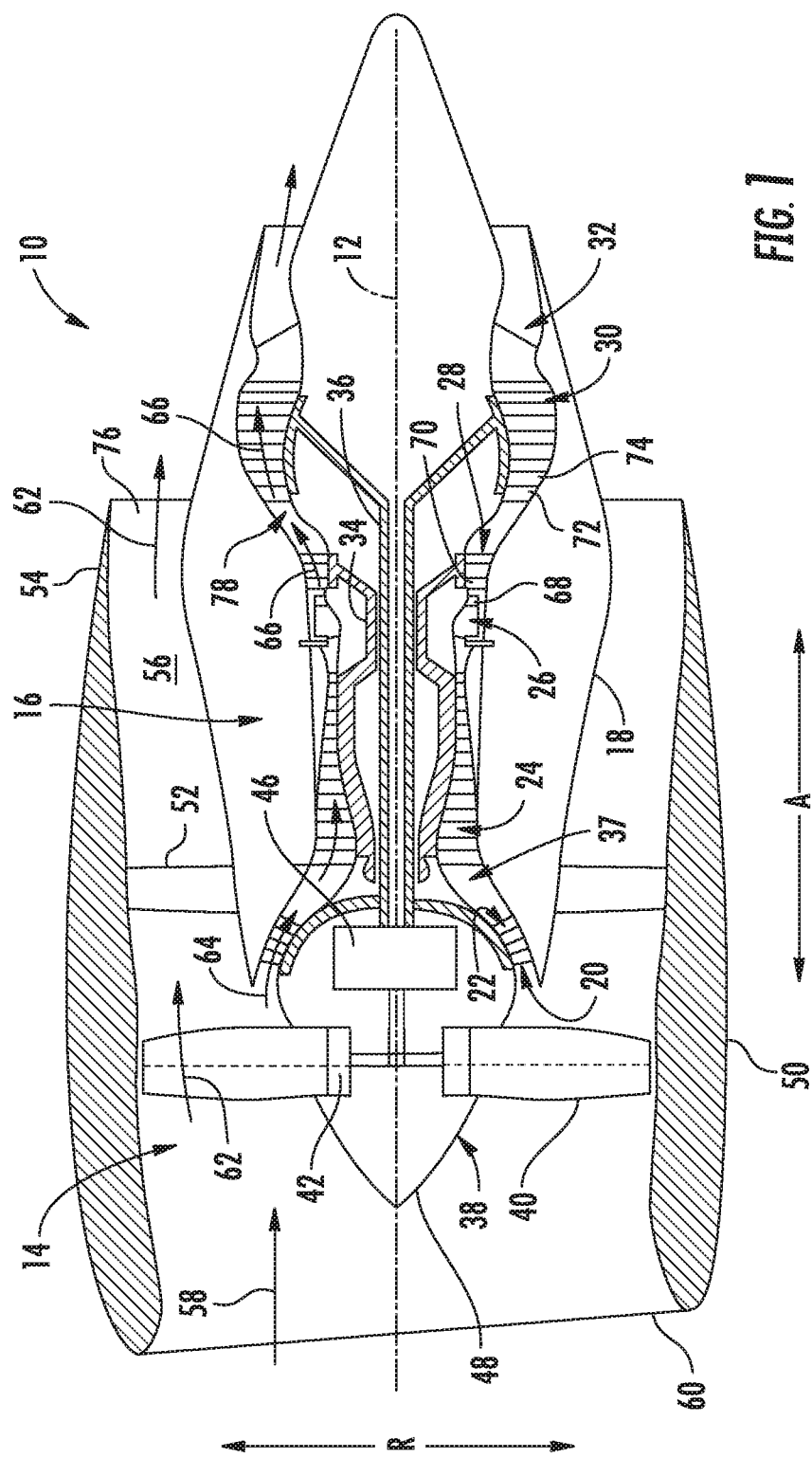
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fixed-pitch fan 38 having a plurality of fan blades 40 coupled to a disk 42 in a spaced apart manner. As is depicted, the fan blades 40 extend outwardly from disk 42 generally along the radial direction R. The fan blades 40 and disk 42 are together rotatable about the longitudinal axis 12 by LP shaft 36 across a reduction gearbox/power gear box 46. The reduction gearbox 46 includes a plurality of gears for adjusting the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may include a variable pitch fan, may be configured as an un-ducted turbofan engine, etc.

Figure 2:
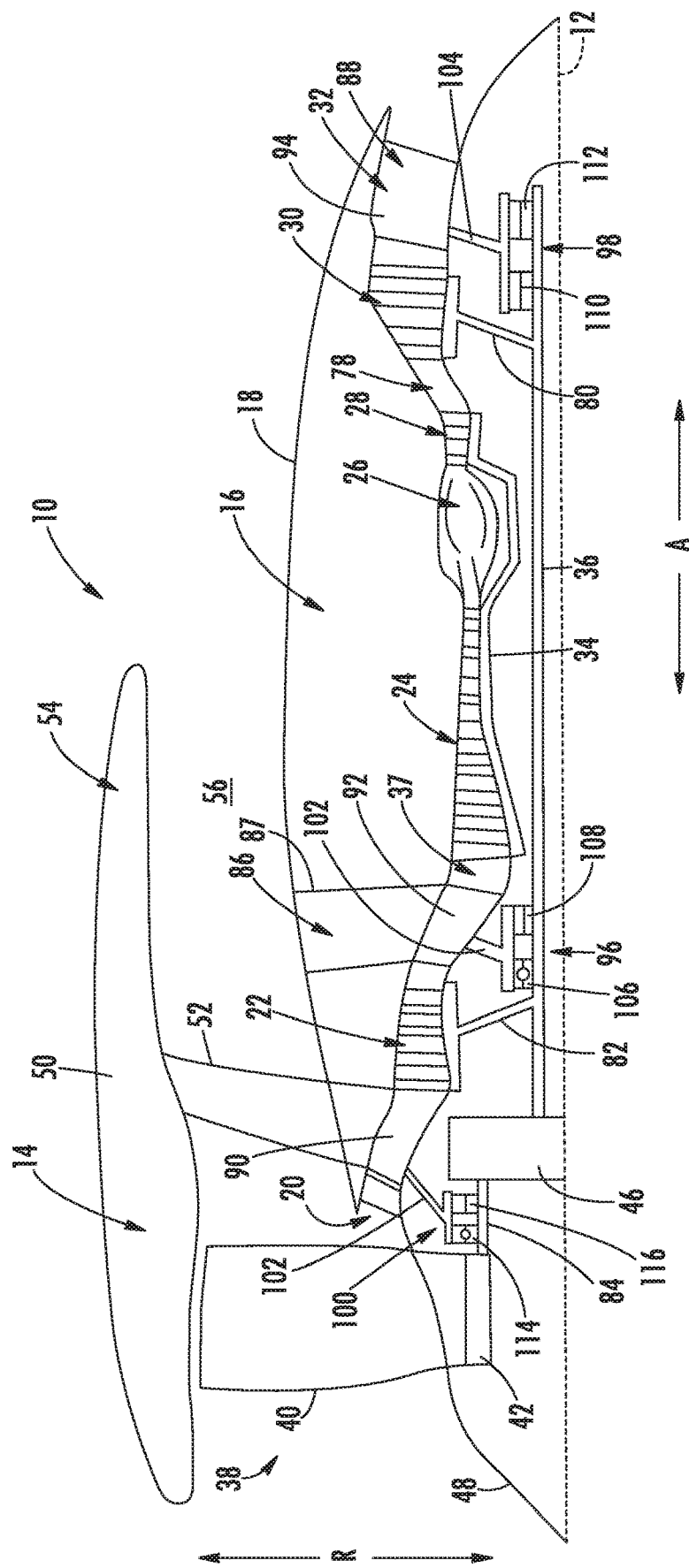
FIG. 2 is a close-up, schematic, cross-sectional view of a gas turbine engine having a bearing configuration in accordance with an exemplary embodiment of the present disclosure.

Referring now to FIG. 2, a schematic, cross-sectional view is provided of a turbofan engine 10 in accordance with an exemplary embodiment of the present disclosure. The exemplary turbofan engine 10 of FIG. 2 may be configured in substantially the same manner as exemplary turbofan engine 10 described above with reference to FIG. 1. Accordingly, the same or similar numbers may refer to the same or similar part.

For example, as is depicted, the turbofan engine 10 depicted defines an axial direction A (extending parallel to a longitudinal centerline 12 of the turbofan 10, provided for reference) and a radial direction R. Additionally, the turbofan engine 10 generally includes a compressor section including an LP compressor 22 and an HP compressor 24; a combustion section 26; and a turbine section located downstream of the compressor section and combustion section 26 and including an HP turbine 28 and an LP turbine 30. The HP turbine 28 is rotatable with the HP compressor 24 through an HP shaft 34, and the LP turbine 30 is rotatable with the LP compressor 22 through an LP shaft 36. More specifically, for the embodiment depicted, the LP shaft 36 includes a turbine extension 80 and a compressor extension 82. The LP shaft 36 is coupled to the LP turbine 30 through the turbine extension 80 and similarly is coupled to the LP compressor 22 through the compressor extension 82.

Additionally, the turbofan engine 10 depicted includes a fan section 14 operable with the core turbine engine. More particularly, the fan section 14 includes a fan 38 and a fan shaft 84, the fan 38 including a plurality of fan blades 40 coupled to a disk 42, and the disk 42 coupled to the fan shaft 84. The fan 38 of the fan section 14 is driven by the LP shaft 36 across the reduction gearbox 46, and more specifically, the fan shaft 84 of the fan section 14 is driven by the LP shaft 36 across the reduction gearbox 46. The reduction gearbox 46 may define a gear ratio of at least about 2:1, such as at least about 2.5:1. Such a configuration may allow for the fan 38 to rotate at a slower rotational speed relative to the LP shaft 36, allowing the LP shaft 36 to rotate much quicker without losing efficiency with the fan 38.

As is also depicted in FIG. 2, the turbofan engine 10 includes a plurality of support members or frames for supporting and providing structure for the turbofan engine 10. For example, the core turbine engine includes a fan frame, a forward frame assembly 86, and a rear frame assembly 88. More specifically, the fan frame includes the outlet guide vanes 52 and a plurality of struts 90 positioned forward of the LP compressor 22, and the forward frame assembly 86 (also referred to as a high pressure compressor forward frame 86) of the exemplary core turbine engine 16 depicted includes support members 87 and a plurality of struts 92 positioned aft of the LP compressor 22 and forward of the HP compressor 24. Similarly, the rear frame assembly 88 of the exemplary core turbine engine depicted includes a plurality of struts 94 aft of the LP turbine 30.

Moreover, in order to support the various rotary components of the turbofan engine 10, the turbofan engine 10 includes a plurality of bearing assemblies. The turbofan engine 10 depicted includes a forward LP bearing assembly 96 supporting the LP shaft 36 within the compressor section and an aft LP bearing assembly 98 supporting the LP shaft 36 within the turbine section. Additionally, the turbofan engine 10 depicted includes a fan bearing assembly 100 supporting rotation of the fan shaft 84 of the fan section 14 of the turbofan engine 10. The fan bearing assembly 100 and the forward LP bearing assembly 96 are each generally supported by the forward frame assembly 86 through respective support members 102 of the forward frame assembly 86. By contrast, the aft LP bearing assembly 98 is generally supported by the rear frame assembly 88 through a support member 104 of the rear frame assembly 88.

Referring still to FIG. 2, for the embodiment depicted, the forward LP bearing assembly 96 supports the LP shaft 36 within the compressor section at a location aft of the compressor extension 82 of the LP shaft 36. Accordingly, the LP compressor 22 may be referred to as being mounted in an "overhung" configuration. Additionally, the forward LP bearing assembly 96 includes a first, forward bearing 106 and a second, aft bearing 108 spaced generally along the axial direction A of the turbofan engine 10. For the embodiment depicted, the first bearing 106 of the forward bearing assembly is a ball bearing and the second bearing 108 of the forward bearing assembly is a roller bearing. More particularly, the ball bearing (i.e., the first bearing 106) is positioned forward of the roller bearing (i.e., the second bearing 108). As will be appreciated, the ball bearing may be configured to support thrust loads in addition to radial loads on the LP shaft 36.

Further, for the embodiment depicted, the aft LP bearing assembly 98 supports the LP shaft 36 within the turbine section a location aft of the turbine extension 80. For the embodiment depicted, the aft LP bearing assembly 98 also includes two bearings spaced generally along the axial direction A, i.e., a third, forward bearing 110 and a fourth, aft bearing 112 spaced generally along the axial direction A. For the embodiment depicted, the third bearing 110 is a roller bearing and the fourth bearing 112 is also a roller bearing.

Further, still for the embodiment depicted, the fan bearing assembly 100 supports the fan shaft 84 within the fan section 14 of the turbofan engine 10 at a location forward of the reduction gearbox 46 and aft of the disk 42 of the fan 38. For the embodiment depicted, the fan bearing assembly 100 includes a fifth bearing 114 and a sixth bearing 116 spaced generally along the axial direction A. Also for the embodiment depicted, the fifth bearing 114 is a ball bearing and the sixth bearing 116 is a roller bearing.

Notably, for the exemplary turbofan engine 10 depicted, the forward LP bearing assembly 96 substantially completely support the LP shaft 36 within the compressor section of the turbofan engine 10 and the aft LP bearing assembly 98 substantially completely support the LP shaft 36 within the turbine section of the turbofan engine 10. Additionally, for the embodiment depicted, the fan bearing assembly 100 substantially completely supports the fan shaft 84 within the fan section 14 of the turbofan engine 10. Notably, as used herein, being supported "substantially completely" generally refers to supporting at least ninety percent (90%) of the forces acting on a component during normal operations of the gas turbine engine.

The turbofan engine having such a configuration may provide for a more stable turbofan engine. More specifically, a turbofan having bearing assemblies configured in accordance with one or more embodiments the present disclosure may allow for the LP shaft rotate at relatively high rotational speeds, without requiring the LP shaft to be undesirably increased in diameter or thickness. More particularly, positioning the forward LP bearing assembly aft of the compressor extension of the LP shaft, such that the fan section is mounted in an overhung configuration, will increase the stability of the LP shaft without requiring an undesirable increase in a diameter and/or thickness of the LP shaft. Further, positioning the aft LP bearing assembly aft of the turbine extension of the LP shaft may allow for more compact mounting of the various components of, e.g., the HP compressor and HP turbine, within the core turbine engine. Therefore, with these configurations, the LP shaft may rotate at a higher rotational speed without reaching critical frequencies during normal engine operations.

It should be appreciated, however, that in other exemplary embodiments, the forward LP bearing assembly 96 may be configured in any other suitable manner. For example, referring now to FIGS. 3 through 5, schematic, cross-sectional views are provided of a turbofan engine 10 in accordance with various other exemplary embodiments of the present disclosure. The exemplary turbofan engines 10 depicted in FIGS. 3 through 5 may be configured in substantially the same manner as exemplary turbofan engine 10 described above with reference to FIG. 2. Accordingly, the same or similar numbers may refer to same or similar part.

Figure 3:
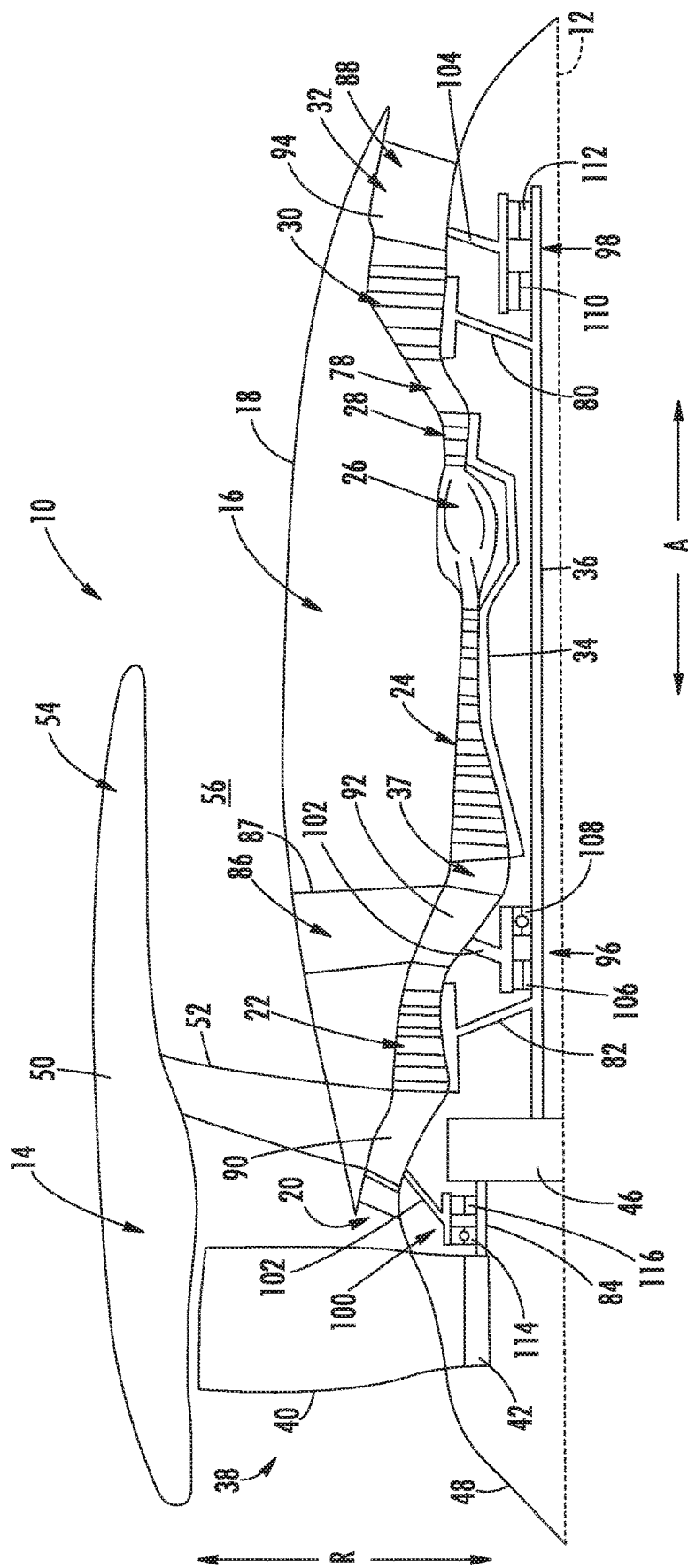
FIG. 3 is a close-up, schematic, cross-sectional view of a gas turbine engine having a bearing configuration in accordance with another exemplary embodiment of the present disclosure.
Figure 4:
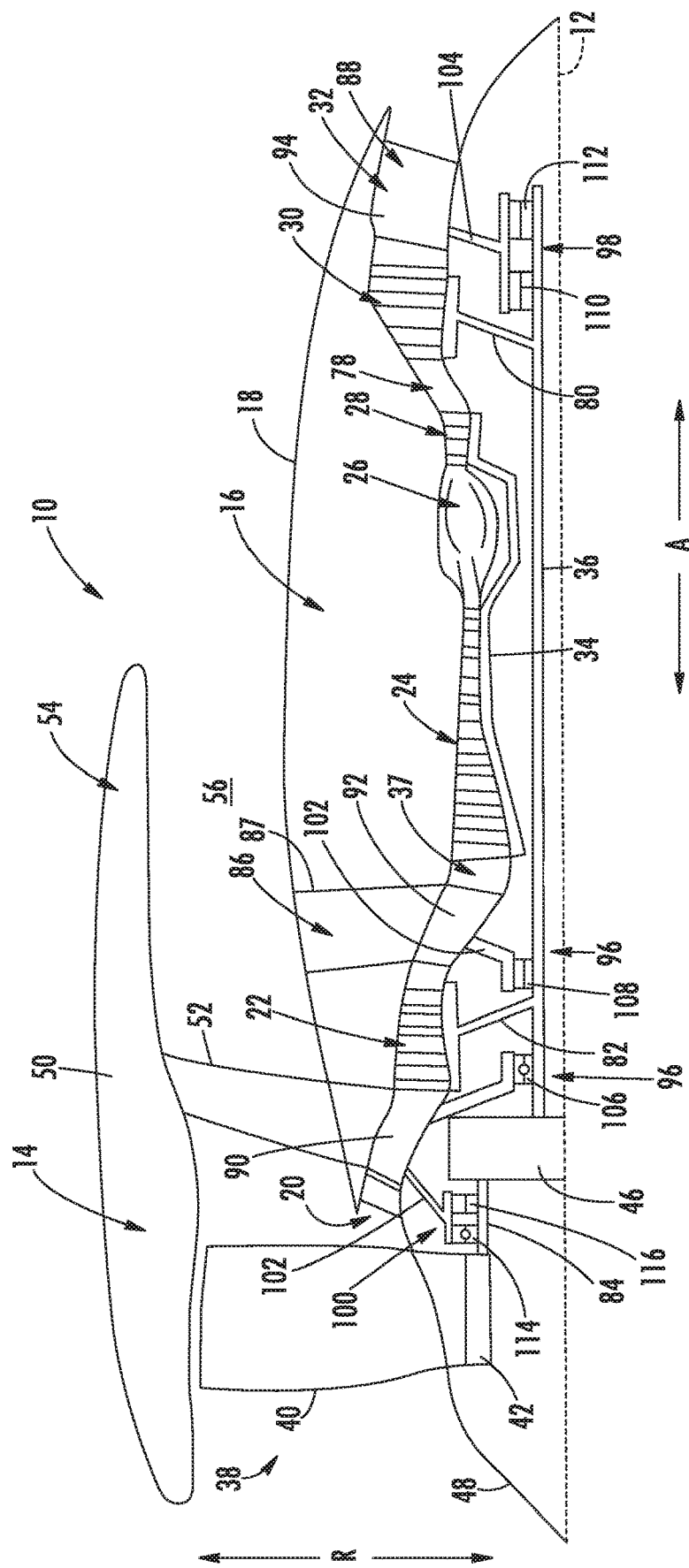
FIG. 4 is a close-up, schematic, cross-sectional view of a gas turbine engine having a bearing configuration in accordance with yet another exemplary embodiment of the present disclosure.
Figure 5:
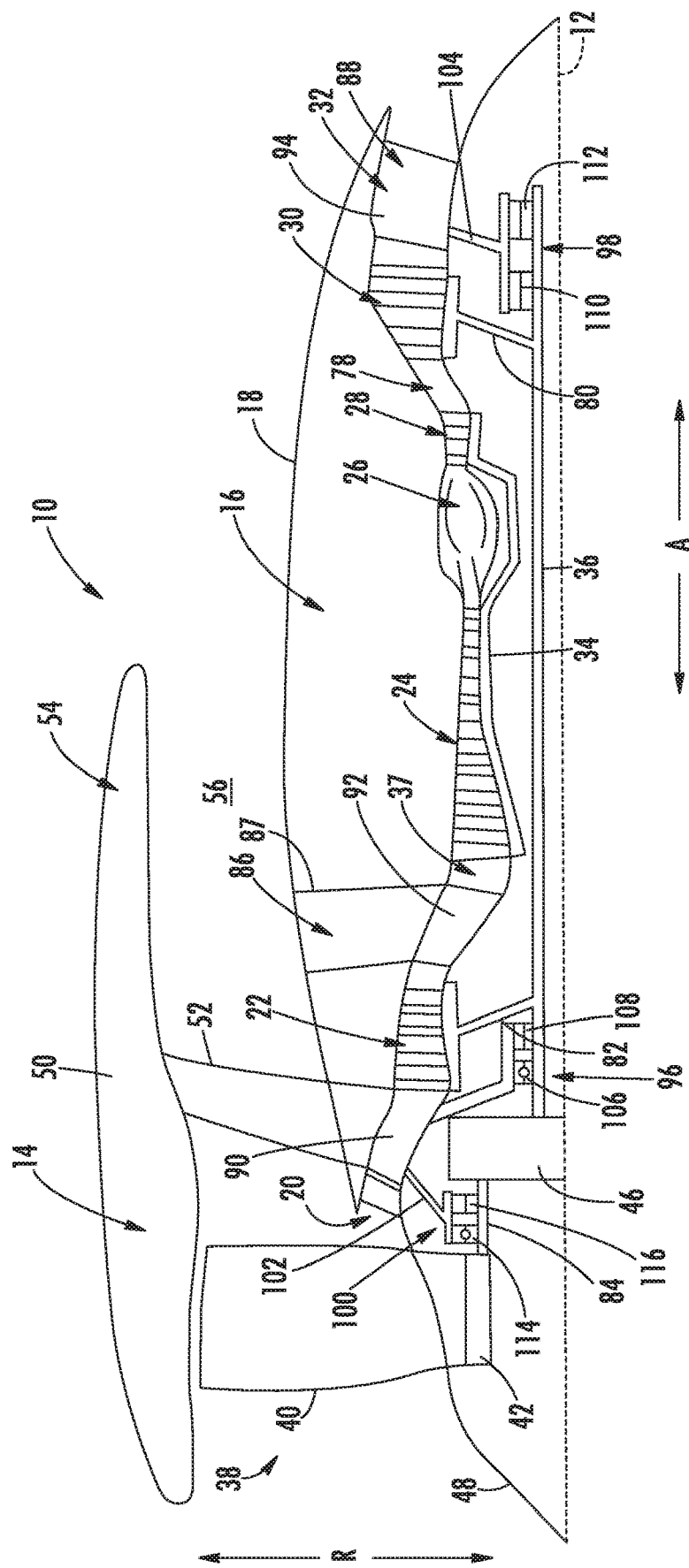
FIG. 5 is a close-up, schematic, cross-sectional view of a gas turbine engine having a bearing configuration in accordance with still another exemplary embodiment of the present disclosure.

For example, each of the turbofan engines 10 depicted in FIGS. 3 through 5 include a forward LP bearing assembly 96 supporting a forward end of an LP shaft 36 within a compressor section of the turbofan engine. Also for the exemplary embodiments depicted in FIGS. 3 through 5, the forward LP bearing assembly 96 includes a first, forward bearing 106 and a second, aft bearing 108.

Referring particularly to the embodiment of FIG. 3, the first and second bearings 106, 108 of the forward bearing assembly 96 are positioned aft of an extension 82 of the LP shaft 36. However, in contrast with the exemplary embodiment of FIG. 2, for the embodiment of FIG. 3, the first, forward bearing 106 is configured as a roller bearing and the second, aft bearing is configured as a ball bearing.

Additionally, referring particularly to the embodiment of FIG. 4, in contrast with the exemplary embodiment of FIG. 2, the first, forward bearing 106 of the forward bearing assembly 96 is positioned forward of an extension 82 of the LP shaft 36, while the second, aft bearing 108 is positioned aft of the extension 82 of the LP shaft 36. For the embodiment depicted, the first, forward bearing 106 is configured as a ball bearing and the second, aft bearing 108 is configured as a roller bearing. However, in other embodiments, the first, forward bearing 106 may instead be configured as a roller bearing, and the second, aft bearing 108 may be configured as a ball bearing.

Moreover, referring now particularly to the embodiment of FIG. 5, each of the first and second bearings 106, 108 of the forward bearing assembly 96 are positioned forward of an extension 82 of the LP shaft 36. Additionally, for the embodiment depicted, the first, forward bearing 106 is configured as a ball bearing and the second, aft bearing 108 is configured as a roller bearing. However, in other embodiments, the first, forward bearing 106 may instead be configured as a roller bearing, and the second, aft bearing 108 may be configured as a ball bearing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and comprising:
    a compressor section including a low pressure compressor;
    a turbine section located downstream of the compressor section and including a low pressure turbine;
    a low pressure shaft including a turbine extension and a compressor extension, the low pressure shaft coupled to the low pressure turbine through the turbine extension and coupled to the low pressure compressor through the compressor extension;
    a forward LP bearing assembly supporting the low pressure shaft within the compressor section at a location aft of the compressor extension, the forward LP bearing assembly comprising a first bearing and a second bearing that are each spaced within the compressor section generally along the axial direction and a portion of each of the first bearing and the second bearing are on the low pressure shaft; and
    an aft LP bearing assembly supporting the low pressure shaft within the turbine section at a location aft of the turbine extension.

2. The gas turbine engine of claim 1, wherein the first bearing of the forward bearing assembly is a ball bearing, and wherein the second bearing of the forward bearing assembly as a roller bearing.

3. The gas turbine engine of claim 2, wherein the ball bearing is positioned forward of the roller bearing.

4. The gas turbine engine of claim 1, wherein the forward LP bearing assembly substantially completely supports the LP shaft within the compressor section, and wherein the aft LP bearing substantially completely supports the LP shaft within the turbine section.

5. The gas turbine engine of claim 1, wherein the aft LP bearing assembly comprises a third bearing and a fourth bearing spaced generally along the axial direction.

6. The gas turbine engine of claim 5, wherein the third bearing is a roller bearing, and wherein the fourth bearing is also a roller bearing.

7. The gas turbine engine of claim 5, wherein the first bearing and the second bearing are each located aft of the compressor extension, and wherein the third bearing and the fourth bearing are each located aft of the of the turbine extension.

8. The gas turbine engine of claim 1, further comprising:
    a fan section comprising a fan; and
    a reduction gearbox, wherein the fan of the fan section is driven by the LP shaft across the reduction gearbox.

9. The gas turbine engine of claim 8, wherein the reduction gearbox defines a gear ratio of 2:1.

10. The gas turbine engine of claim 8, wherein the compressor section and the turbine section are configured as part of a core turbine engine of the gas turbine engine, and wherein the gas turbine engine further comprises:
    an outer nacelle extending around and surrounding at least a portion of the fan of the fan section and at least a portion of the core turbine engine.

11. The gas turbine engine of claim 8, wherein the fan section further comprises a fan shaft, wherein the gas turbine engine further comprises a fan gear assembly supporting rotation of the fan shaft.

12. The gas turbine engine of claim 1, wherein the compressor section further comprises a high pressure compressor located downstream of the low pressure compressor, wherein the turbine section further comprises a high pressure turbine located upstream of the low pressure turbine, and wherein the gas turbine engine further comprises a high pressure shaft extending between the high pressure turbine and the high pressure compressor.

13. A gas turbine engine defining an axial direction and comprising:
    a compressor section including a low pressure compressor;
    a turbine section located downstream of the compressor section and including a low pressure turbine;
    a low pressure shaft including a turbine extension and a compressor extension, the low pressure shaft coupled to the low pressure turbine through the turbine extension and coupled to the low pressure compressor through the compressor extension;
    a forward LP bearing assembly supporting the low pressure shaft within the compressor section at a location aft of the compressor extension, the forward LP bearing assembly comprising a first bearing and a second bearing that are each spaced within the compressor section generally along the axial direction and a portion of each of the first bearing and the second bearing are on the low pressure shaft; and an aft LP bearing assembly supporting the low pressure shaft within the turbine section at a location aft of the turbine extension, the aft LP bearing assembly comprising a forward bearing and an aft bearing spaced generally along the axial direction.

14. The gas turbine engine of claim 13, wherein the first bearing of the forward bearing assembly is a ball bearing, and wherein the second bearing of the forward bearing assembly is a roller bearing.

15. The gas turbine engine of claim 14, wherein the ball bearing is positioned forward of the roller bearing.

16. The gas turbine engine of claim 13, wherein the forward LP bearing assembly substantially completely supports the LP shaft within the compressor section, and wherein the aft LP bearing substantially completely supports the LP shaft within the turbine section.

17. The gas turbine engine of claim 13, wherein the forward bearing of the aft LP bearing assembly is a roller bearing, and wherein the aft bearing of the aft LP bearing assembly is also a roller bearing.

18. The gas turbine engine of claim 13, further comprising:
a fan section comprising a fan; and
a reduction gearbox, wherein the fan of the fan section is driven by the LP shaft across the reduction gearbox.

19. The gas turbine engine of claim 18, wherein the compressor section and the turbine section are configured as part of a core turbine engine of the gas turbine engine, and wherein the gas turbine engine further comprises:
an outer nacelle extending around and surrounding at least a portion of the fan of the fan section and at least a portion of the core turbine engine.

20. The gas turbine engine of claim 18, wherein the fan section further comprises a fan shaft, wherein the gas turbine engine further comprises a fan gear assembly supporting rotation of the fan shaft.

* * * * *